United States Patent
Fujikake et al.

(10) Patent No.: US 10,414,303 B2
(45) Date of Patent: Sep. 17, 2019

(54) SEAT

(71) Applicants: Tachi-S Co., Ltd., Tokyo (JP); Honda Motor Co., Ltd., Tokyo (JP)

(72) Inventors: Tsutomu Fujikake, Tokyo (JP); Tomoyo Futakawame, Saitama (JP); Tomoyuki Uemura, Saitama (JP); Taku Nagasawa, Saitama (JP); Shinobu Sasaki, Saitama (JP)

(73) Assignees: Tachi-S Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/567,189

(22) PCT Filed: Apr. 12, 2016

(86) PCT No.: PCT/JP2016/061844
§ 371 (c)(1),
(2) Date: Oct. 17, 2017

(87) PCT Pub. No.: WO2016/171045
PCT Pub. Date: Oct. 27, 2016

(65) Prior Publication Data
US 2018/0099593 A1    Apr. 12, 2018

(30) Foreign Application Priority Data
Apr. 23, 2015  (JP) .................... 2015-088629

(51) Int. Cl.
*B60N 2/60* (2006.01)
*B60N 2/58* (2006.01)
(Continued)

(52) U.S. Cl.
CPC ............ *B60N 2/5816* (2013.01); *A47C 31/02* (2013.01); *A47C 31/11* (2013.01); *B60N 2/60* (2013.01);
(Continued)

(58) Field of Classification Search
CPC .. B60N 2/6027; B60N 2/5816; B60N 2/5825; B60N 2/5833; B60N 2/60; B60N 2/6018; B60N 2/6036; B60N 2/7005
(Continued)

(56) References Cited

U.S. PATENT DOCUMENTS

| 4,047,756 A * | 9/1977 | Ney .................... B60N 2/58 297/219.1 |
| 7,600,335 B2 * | 10/2009 | Suprina ................ G09F 7/06 297/217.1 |

(Continued)

FOREIGN PATENT DOCUMENTS

| DE | 10-2005-012320 A1 | 9/2009 |
| JP | H02-125673 U | 10/1990 |

(Continued)

OTHER PUBLICATIONS

International Search Report issued in corresponding International Patent Application No. PCT/JP2016/061844 dated Jul. 12, 2016.
(Continued)

*Primary Examiner* — Syed A Islam
(74) *Attorney, Agent, or Firm* — Morgan, Lewis & Bockius LLP

(57) ABSTRACT

A seat (1) comprises: a seat member (3(2)) that includes a cushioning material (4); and a fastening member (5) that allows a trim cover (7) to be detachably attached to a predetermined position on the seat member (3). The fastening member (5) is constituted by a slide fastener that includes: a fastener part (51) constituted by one fastener half (511) and another fastener half (512); and a slider part. At least part of a base part (6) provided in the one fastener half (511) is embedded in the cushioning material (4), and part of the other fastener half (512) is fixed to the trim cover (7).

7 Claims, 4 Drawing Sheets

(51) Int. Cl.
*A47C 31/02* (2006.01)
*A47C 31/11* (2006.01)
*B68G 7/052* (2006.01)
*B60N 2/70* (2006.01)

(52) U.S. Cl.
CPC ............ *B68G 7/052* (2013.01); *B60N 2/5825* (2013.01); *B60N 2/5833* (2013.01); *B60N 2/6018* (2013.01); *B60N 2/6027* (2013.01); *B60N 2/6036* (2013.01); *B60N 2/7005* (2013.01)

(58) Field of Classification Search
USPC .............. 297/218.4, 452.61, 452.62, 228.12, 297/228.11, 228.1, 195.1–215.16, 214, 297/218.2, 228.13
See application file for complete search history.

(56) References Cited

U.S. PATENT DOCUMENTS 8,197,010 B2 * 6/2012 Galbreath ............ B60N 2/5825
297/218.2

2002/0101109 A1 * 8/2002 Stiller .................. B60N 2/5825
297/452.6
2006/0237986 A1 10/2006 Brockschneider et al.
2012/0174352 A1 7/2012 Tsunoda

FOREIGN PATENT DOCUMENTS

| | | |
|---|---|---|
| JP | H02-141256 U | 11/1990 |
| JP | H06-014828 Y2 | 4/1994 |
| JP | H06-254268 A | 9/1994 |
| JP | 2011-010727 A | 1/2011 |
| JP | 2011-069417 A | 4/2011 |
| WO | 2011/058415 A1 | 5/2011 |

OTHER PUBLICATIONS

International Preliminary Report on Patentability issued in corresponding International Patent Application No. PCT/JP2016/061844 dated Oct. 24, 2017.

* cited by examiner

SEAT

TECHNICAL FIELD

The present invention relates to a seat to which a trim cover is detachably attached.

BACKGROUND ART

A conventional seat which has been proposed allows a trim cover (a surface cover) to be detachably attached to a cushioning material which is formed of a foaming material molded into a seat shape and such seat has been being used for vehicles, etc. Another seat which has been proposed has a cushioning material provided with a drag-in part, in which a trim cover is dragged and fastened by a hook and loop fastener (see, for example, Patent Document 1).

CITATION LIST

Patent Document

Patent Document 1: JPH06-254268 A

SUMMARY

Technical Problem

However, in the seat using such hook and loop fastener, since the trim cover can be fastened even if it is out of position to some degree, it is difficult for the trim cover to be securely positioned at a predetermined position without being misaligned in each of the forward, rearward, rightward, leftward, upward and downward directions when the trim cover is dragged. In addition, it is often necessary to use a tool to cause the hook and loop fastener to be fastened entirely and securely in a narrow space inside the drag-in part, and it is typically difficult to perform an operation of fastening the trim cover while positioning the trim cover in a rapid and simple manner. Furthermore, frequently repeating the attachment and detachment of the trim cover may degrade the fastening function of the hook and loop fastener.

An object of the present invention is to provide a seat capable of allowing a trim cover to be attached securely at a predetermined position on a seat member, allowing the trim cover to be attached and detached in a rapid and simple manner without using a tool, and preventing the fastening function from being degraded even if the trim cover is frequently attached and detached.

Solution to Problem

In order to solve the above-mentioned problem, the present invention provides a seat comprising: a seat member that includes a cushioning material; and a fastening member that allows a trim cover to be detachably attached to a predetermined position on the seat member; wherein the fastening member is constituted by a slide fastener that includes: a fastener part constituted by one fastener half and another fastener half; and a slider part that slides along the fastener part so as to open and close the one fastener half and the other fastener half; wherein at least part of a base part provided in the one fastener half is embedded in the cushioning material; and wherein part of the other fastener half is fixed to the trim cover.

In such seat, since the slide fastener with the one fastener half being attached to the cushioning material via the base part and the other fastener half being fixed to the trim cover is used as the fastening member, the trim cover can be securely attached at the predetermined position on the seat member. In this way, since the trim cover can be positioned at the position where it is to be attached, it is possible to maintain the stable quality of the seat.

Since this seat has the fastening member constituted by the slide fastener, the trim cover can be attached and detached in a rapid and simple manner without using a tool, etc.

In addition, since this seat has the fastening member constituted by the slide fastener, even if the trim cover is frequently attached and detached, the fastening function of the slide fastener will not be degraded, unlike with a hook and loop fastener.

The one fastener half may be accommodated in a drag-in groove. When the trim cover is dragged and fastened in the drag-in groove, the trim cover can be securely and easily fastened using the slide fastener in this seat. The one fastener half fixed to the cushioning material is accommodated in the drag-in groove.

It is preferable for at least part of the base part to have a width larger than a thickness of the one fastener half in a thickness direction of the one fastener half. Such base part enhances the holding force of the fastening member with at least part thereof being embedded in the cushioning material.

The base part may be formed in a platy shape.

A slit may be provided on a lateral portion of the base part. When the fastening member is curved in accordance with the curved shape of the drag-in groove, the slit allows the fastening member to be easily curved.

It is preferable for the base part to be provided with a projection. The projections increase the contact area between the base part and a resin such as urethane to thereby further increase the holding force of the base part.

It is preferable for the ends of the base part to be projected with respect to ends of the fastening member in a longitudinal direction of the fastening member. With such configuration, it becomes difficult for the base part to be peeled off from the cushioning material and the holding force of the base part is further enhanced.

Advantageous Effects of Invention

According to the present invention, it becomes possible to securely attach a trim cover to a predetermined position on a seat member, to attach and detach the trim cover in a rapid and simple manner without using a tool, etc., and to prevent the fastening function from being degraded even when the trim cover is frequently attached and detached.

DESCRIPTION OF EMBODIMENTS

Figure 1:
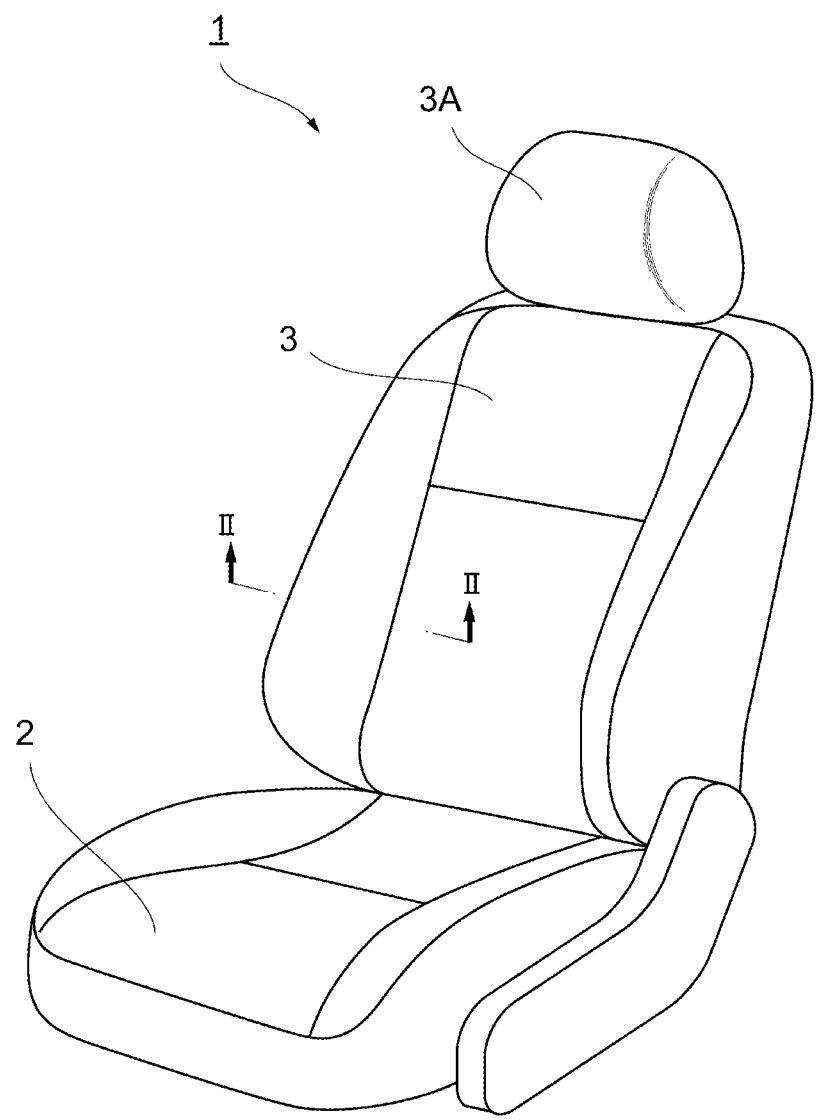
FIG. 1 is a perspective view showing a seat according to an embodiment of the present invention.

A preferred embodiment of a seat according to the present invention will now be described in detail with reference to the attached drawings (see FIGS. 1-4).

A seat 1 includes: a seat face 2 that is forwardly and rearwardly movable on a floor panel of a vehicle; and a backrest 3 that is reclinable relative to the seat face 2 and provided with a headrest 3A. The seat face 2 and the backrest 3 are each a seat member constituting the seat 1 and each have a cushioning material 4 made of a foaming material. A trim cover 7 can be detachably attached to the seat face 2 and the backrest 3 using a fastening member 5. The seat face 2 and the backrest 3 are provided with a plurality of linear drag-in grooves 10.

The following description will describe the backrest 3 as an example. The cushioning material 4 constituting the backrest 3 includes a main cushioning part 41 for supporting the back of an occupant from the rear side thereof and a side cushioning part 42 for holding the back of the occupant from lateral sides thereof (see FIG. 2).

Figure 2:
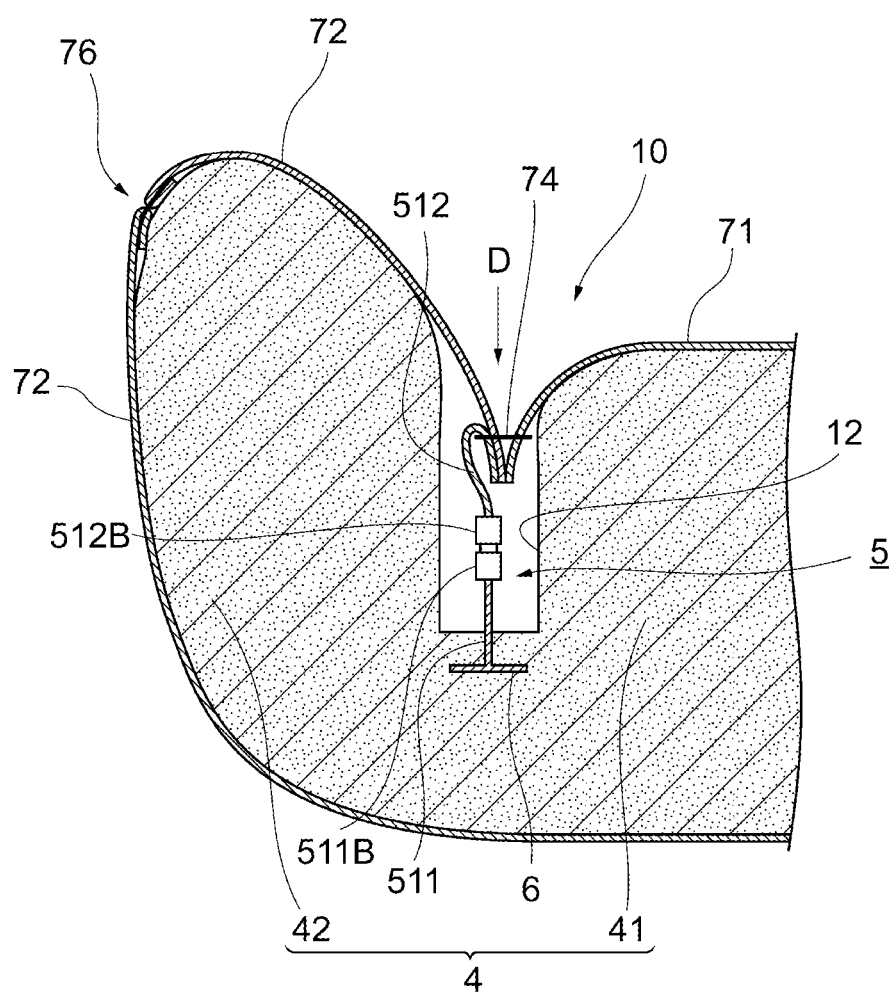
FIG. 2 is a cross-sectional view showing a configuration of a backrest (seat member) taken along line II-II in FIG. 1.

The trim cover 7 is formed by a main face part 71 mounted on the main cushioning part 41 of the cushioning material 4 and a side face part 72 mounted on the side cushioning part 42. The main face part 71 and the side face part 72 of the trim cover 7 are configured such that: they are joined with each other by a sewing part 74 with their respective front surfaces being in contact with each other; and when the main face part 71 and the side face part 72 cover the cushioning material 4 with the front surfaces thereof facing the occupant and the back surfaces thereof facing the cushioning material 4, the sewing part 74 and a distal end portion, relative to the sewing part 74, of the trim cover 7 will not be exposed to the front surface side (see FIG. 2). It should be noted that, although the side face part 72 of the trim cover 7 in FIG. 2 is formed by integrally sewing separate skins at a second sewing part 76, the side face part 72 may be configured by an unsewn single skin, as a matter of course.

Next, a drag-in groove 10 will be described. The drag-in groove 10 is constituted by a recess 12 formed so as to have a predetermined width along a boundary between the main cushioning part 41 and the side cushioning part 42, and the drag-in groove 10 forms the exterior appearance of the seat 1 and accommodates a base-side tape portion 511 of the fastening member 5 used for dragging the trim cover 7. During the normal time, the recess 12 is compressed and closed between the main cushioning part 41 and the side cushioning part 42 due to the elasticity of the cushioning material 4. However, for ease of understanding, FIG. 2 shows the recess 12 in an open state. The trim cover 7 can be dragged and fixed onto the seat 1 by inserting a cover-side tape portion 512 of the fastening member 5 into the drag-in groove 10 in the depth direction D of the recess 12 and fastening the fastening member 5 by engaging the cover-side tape portion 512 with the base-side tape portion 511.

The fastening member 5 is a member that enables the trim cover 7 to be attached to and detached from the surface of the cushioning material 4. The fastening member 5 of the present embodiment is constituted by a slide fastener 50, including a fastener part 51 and a slider part 52 (see FIGS. 2 and 3).

The fastener part 51 of the slide fastener 50 is constituted by the base-side tape portion 511 and the cover-side tape portion 512. The base-side tape portion 511 and the cover-side tape portion 512 include elements (teeth) 511B and 512B which are to be engaged with each other, and an insertion pin (FIG. 2 only shows an insertion pin 512C of the cover-side tape portion 512) (see FIG. 3).

The slider part 52 of the slide fastener 50 is slid along the fastener part 51 in an arrangement direction of the elements 511B and 512B (hereinafter referred to as the "slide direction" and denoted with reference symbol "S"), and the slider part 52: engages with the elements 511B of the base-side tape portion 511 and the elements 512B of the cover-side tape portion 512 in order to bring the fastening member 5 into the "fastened state"; or disengages from such elements 511B and 512B in order to release the fastening member 5 from the "fastened state."

Figure 3:
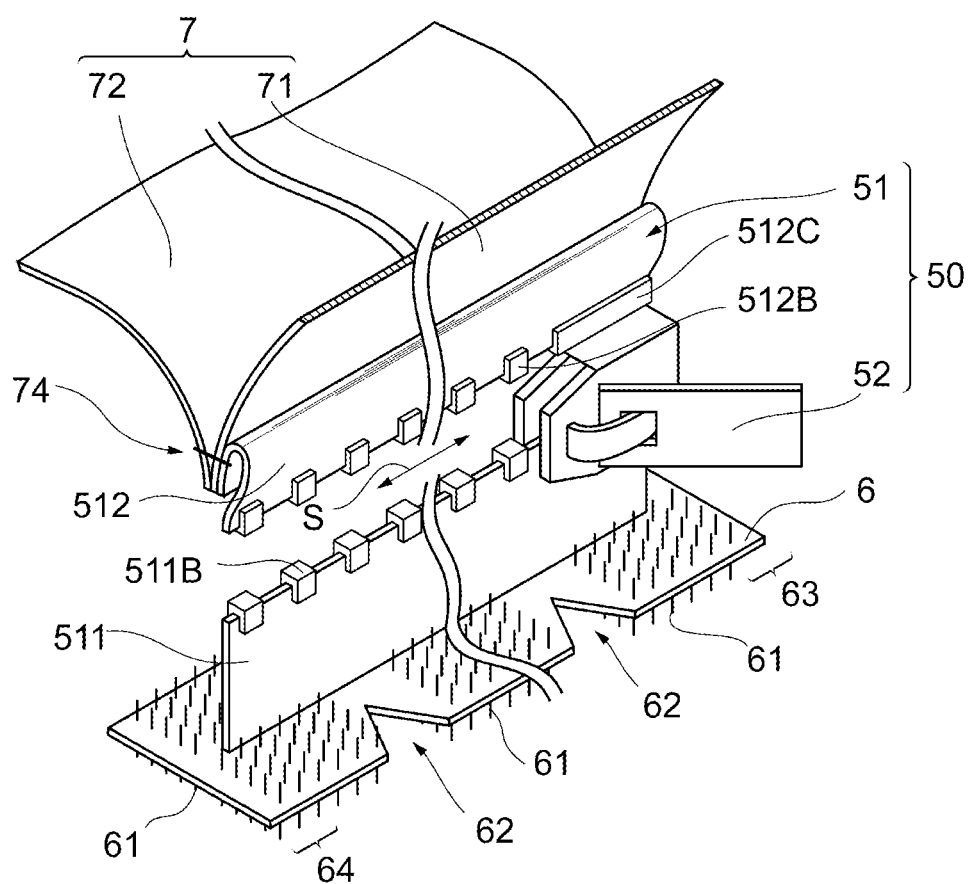
FIG. 3 is a perspective view showing a configuration example of a fastening member, etc. in an enlarged manner.
Figure 4:
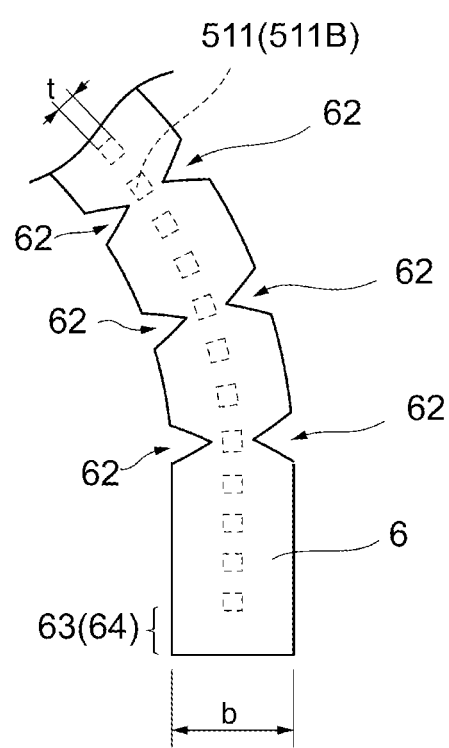
FIG. 4 is a plan view (a diagram as viewed along a depth direction D of a recess) showing a base part curved toward a lateral side.

The cover-side tape portion 512 is sewn with the main face part 71 and the side face part 72 of the trim cover 7 at the sewing part 74 so as to be secured to the trim cover 7 (see FIGS. 2 and 3). It should be noted that, although an example of securing the cover-side tape portion 512 by sewing has been described in the present embodiment, the cover-side tape portion 512 may alternatively be secured by welding or the like.

A base part 6 is provided at an edge of the base-side tape portion 511 (if the base-side tape portion 511 has a large width, the base part 6 is formed at the mid-point of the base-side tape portion 511 (See FIGS. 2 and 3). The base part 6 is constituted by, for example, a resin-made platy member having a width b that is larger than the thickness t of the base-side tape portion 511 (see FIG. 4). The base part 6 is at least partially (preferably entirely) embedded in the cushioning material 4 by an integral foam molding using urethane resin (see FIG. 2) and the base part 6 is widened in a direction perpendicular to the depth direction D so as to enhance the holding force of the fastening member 5. In terms of the aspect that the base part 6 is widened in the direction perpendicular to the depth direction D, the base part 6 may have any shape as long as at least a portion thereof has the width b that is larger than the thickness t of the base-side tape portion 511, and the base part 6 may have shapes other than the above-mentioned platy shape or may have a shape having a thickness in the depth direction D with, for example, a circular or rectangular cross section.

The platy member constituting the base part 6 may be made of a material such as a felt or a fabric. The base part 6 constituted by the platy member made of such material may be attached by sewing to the base-side tape portion 511 of the fastening member 5. When the platy member constituting the base part 6 is made of a material other than resin, such material (a material such as a felt or a fabric) may further be impregnated with a resin, such as urethane, of the cushioning material 4.

A surface of the base part 6 made of, for example, a resin is provided with projections 61 (see FIG. 3). The projections 61 projected toward the resin, such as urethane, of the cushioning material 4 increase the contact area between the base part 6 and the cushioning material 4 to thereby further increase the holding force of the base part 6. Although the projections 61 are formed on both surfaces (an upper surface and a lower surface) of the base part 6 in the depth direction D of the recess 12 in the present embodiment, the projections 61 may instead be formed on only one surface. In addition, projections 61 that extend in the direction perpendicular to the depth direction D may also be formed, although they are not shown here. In terms of increasing resistance by increasing the contact area between the base part 6 and the cushioning material 4, a surface(s) of the base part 6 may have irregularities or be provided with a plurality of dents, instead of the projections 61.

Lateral portions of the base part 6 are provided with slits 62 (see FIG. 3). When the drag-in groove 10 is curved at a mid-point thereof, the slits 62 allow the base part 6 to be easily curved toward a lateral side in accordance with the curved shape of the drag-in groove 10 (see FIG. 4).

Ends 63, 64 in the slide direction S of the base part 6 are projected relative to the ends of the slide fastener 50 constituting the fastening member 5 in the slide direction S, and the base part 6 of the present embodiment is configured so as to be longer than the slide fastener 5 (see FIG. 3). It is difficult for such base part 6 to be peeled off from the cushioning material 4 and thus such base part 6 has an enhanced holding force.

Since other drag-in grooves in the backrest 3, as well as drag-in grooves in the seat face 2, have the same configuration as that of the above-mentioned drag-in groove 10, the description thereof will be omitted.

In the above-described seat 1 according to the present embodiment, since the slide fastener 50 with the base-side tape portion 511 being attached to the cushioning material 4 and the cover-side tape portion 512 being sewn and fixed to the trim cover 7 is used as the fastening member 5, the trim cover 7 can be securely attached to a predetermined position on the backrest 3 or on the seat face 2. In addition, since the trim cover 7 can be attached or detached in a rapid and simple manner without using a tool in the seat 1, it is possible to easily perform the operations of replacing the trim cover 7 in accordance with the season or attaching or detaching the trim cover 7 for cleaning. Furthermore, since the slide fastener 50 is used as the fastening member 5 in the seat 1, even if the trim cover 7 is frequently attached and detached, the fastening function of the fastening member 5 will not be degraded, unlike with the hook and loop fastener.

It should be noted that the above-described embodiment is merely an example of a preferred embodiment of the present invention, and the present invention is not limited thereto and various modifications can be made thereto without departing from the gist of the present invention. For example, the seat 1 according to the present invention 1 may be utilized as aircraft seats, passenger ship seats, etc., in addition to automobile seats.

INDUSTRIAL APPLICABILITY

The present invention is suitably applicable to a seat having: a seat member including a cushioning material; and a fastening member that allows a trim cover to be detachably attached to a predetermined position on the seat member.

REFERENCE SIGNS LIST

1: seat
2: seat face (seat member)
3: backrest (seat member)
4: cushioning material
5: fastening member
6: base part
7: trim cover
10: drag-in groove
50: slide fastener
51: fastener part
52: slider part
61: projection
62: slit
63, 64: ends of the base part
511: base-side tape portion (one fastener half)
512: cover-side tape portion (the other fastener half)
b: width of the base part
t: thickness of the base-side tape portion (thickness of one fastener half)
S: slide direction (longitudinal direction of the fastening member)

What is claimed is:

1. A seat comprising: a seat member that includes a cushioning material; and a fastening member that allows a trim cover to be detachably attached to a predetermined position on the seat member; wherein:
    the fastening member is constituted by a slide fastener that includes: a fastener part constituted by one fastener half and another fastener half; and a slider part that slides along the fastener part so as to open and close the one fastener half and the other fastener half;
    at least part of a base part provided in the one fastener half is embedded in the cushioning material;
    part of the other fastener half is fixed to the trim cover;
    the one fastener half is accommodated in a drag-in groove;
    at least part of the base part has a width larger than a thickness of the one fastener half in a thickness direction of the one fastener half; and
    the base part is provided with a projection that extends in the depth direction of the drag-in groove.

2. The seat according to claim 1, wherein the base part is formed in a platy shape.

3. The seat according to claim 1, wherein a slit is provided on a lateral portion of the base part.

4. The seat according to claim 1, wherein the ends of the base part are projected with respect to ends of the fastening member in a longitudinal direction of the fastening member.

5. The seat according to claim 2, wherein a slit is provided on a lateral portion of the base part.

6. The seat according to claim 2, wherein the ends of the base part are projected with respect to ends of the fastening member in a longitudinal direction of the fastening member.

7. The seat according to claim 1, wherein the projection is disposed on a lower surface of the base part.

* * * * *